(12) United States Patent
Herrmann et al.

(10) Patent No.: US 9,435,422 B2
(45) Date of Patent: Sep. 6, 2016

(54) HYDRAULIC SYSTEM OF A TRANSMISSION DEVICE WITH A LUBRICATION CIRCUIT

(71) Applicant: ZF Friedrichshafen AG, Friedrichshafen (DE)

(72) Inventors: Markus Herrmann, Scheidegg (DE); Robert Erath, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 27 days.

(21) Appl. No.: 14/522,802

(22) Filed: Oct. 24, 2014

(65) Prior Publication Data
US 2015/0114497 A1 Apr. 30, 2015

(51) Int. Cl.
F16H 57/04 (2010.01)
F16H 61/00 (2006.01)

(52) U.S. Cl.
CPC ...... *F16H 57/0413* (2013.01); *F16H 57/0446* (2013.01); *F16H 57/0476* (2013.01); *F16H 61/0021* (2013.01); *F16H 2061/0037* (2013.01); *Y10T 137/87362* (2015.04)

(58) Field of Classification Search
CPC ........... F16H 57/0413; F16H 57/0446; F16H 57/0476; F16H 61/0021
See application file for complete search history.

(56) References Cited

U.S. PATENT DOCUMENTS

| | | | | |
|---|---|---|---|---|
| 5,700,226 A * | 12/1997 | Droste | ................ | F16H 61/0021 475/120 |
| 6,899,074 B1 * | 5/2005 | Carlsson | ............. | F16H 57/0413 123/196 AB |
| 2002/0004436 A1 * | 1/2002 | Vorndran | ............ | F16H 57/0413 475/91 |
| 2004/0149535 A1 * | 8/2004 | Schmidt | ................... | F16D 25/14 192/85.63 |
| 2005/0269181 A1 * | 12/2005 | Gierer | ................. | F16H 57/0413 192/3.3 |
| 2008/0234099 A1 * | 9/2008 | Gierer | ..................... | F16D 48/04 477/79 |
| 2008/0234100 A1 * | 9/2008 | Gierer | ..................... | F16D 48/02 477/80 |
| 2009/0286643 A1 * | 11/2009 | Brown | ................... | F16H 37/022 475/127 |
| 2009/0291802 A1 * | 11/2009 | Herrmann | ........... | F16D 48/0206 477/39 |
| 2010/0243401 A1 * | 9/2010 | Diosi | .................. | F16H 63/3026 192/85.17 |

(Continued)

OTHER PUBLICATIONS

German Patent Office Search Report, Sep. 4, 2014.

*Primary Examiner* — Craig Schneider
*Assistant Examiner* — Kevin Barss
(74) *Attorney, Agent, or Firm* — Dority & Manning, P.A.

(57) ABSTRACT

A hydraulic system of a transmission device with a lubrication circuit, which is supplied with hydraulic fluid downstream of a cooling device for cooling and lubrication, is described. One part of the volume flow of hydraulic fluid led through the cooling device is able to be discharged downstream of the cooling device and upstream of the lubrication circuit in the direction of a hydraulic fluid reservoir. A valve device arranged downstream of the cooling device and upstream of the lubrication circuit is provided, which valve device is transferable into a first operating state and into a second operating state depending on the operating condition, whereas, in the first operating state of the valve device, a volume flow of hydraulic fluid supplied to the valve device is able to be discharged at least partially in the direction of the hydraulic fluid reservoir, while, in the second operating state of the valve device, a volume flow of hydraulic fluid supplied to the valve device is able to be supplied at least partially to a shifting element of the transmission device.

14 Claims, 1 Drawing Sheet

(56) References Cited

U.S. PATENT DOCUMENTS

| | | | |
|---|---|---|---|
| 2011/0031423 A1* | 2/2011 | Herrmann | F16D 25/123 251/12 |
| 2011/0131969 A1* | 6/2011 | Ghike | B60K 6/48 60/456 |
| 2011/0197982 A1* | 8/2011 | Moorman | F16H 61/0031 137/565.11 |
| 2012/0144940 A1* | 6/2012 | Moehlmann | F16H 61/0021 74/331 |
| 2012/0329606 A1* | 12/2012 | Herrmann | F16H 61/0206 477/127 |
| 2013/0025396 A1* | 1/2013 | Herrmann | F16H 61/0251 74/473.11 |
| 2013/0174722 A1* | 7/2013 | Schmidt | F15B 15/26 91/45 |
| 2014/0373524 A1 | 12/2014 | Schuller et al. | |

\* cited by examiner

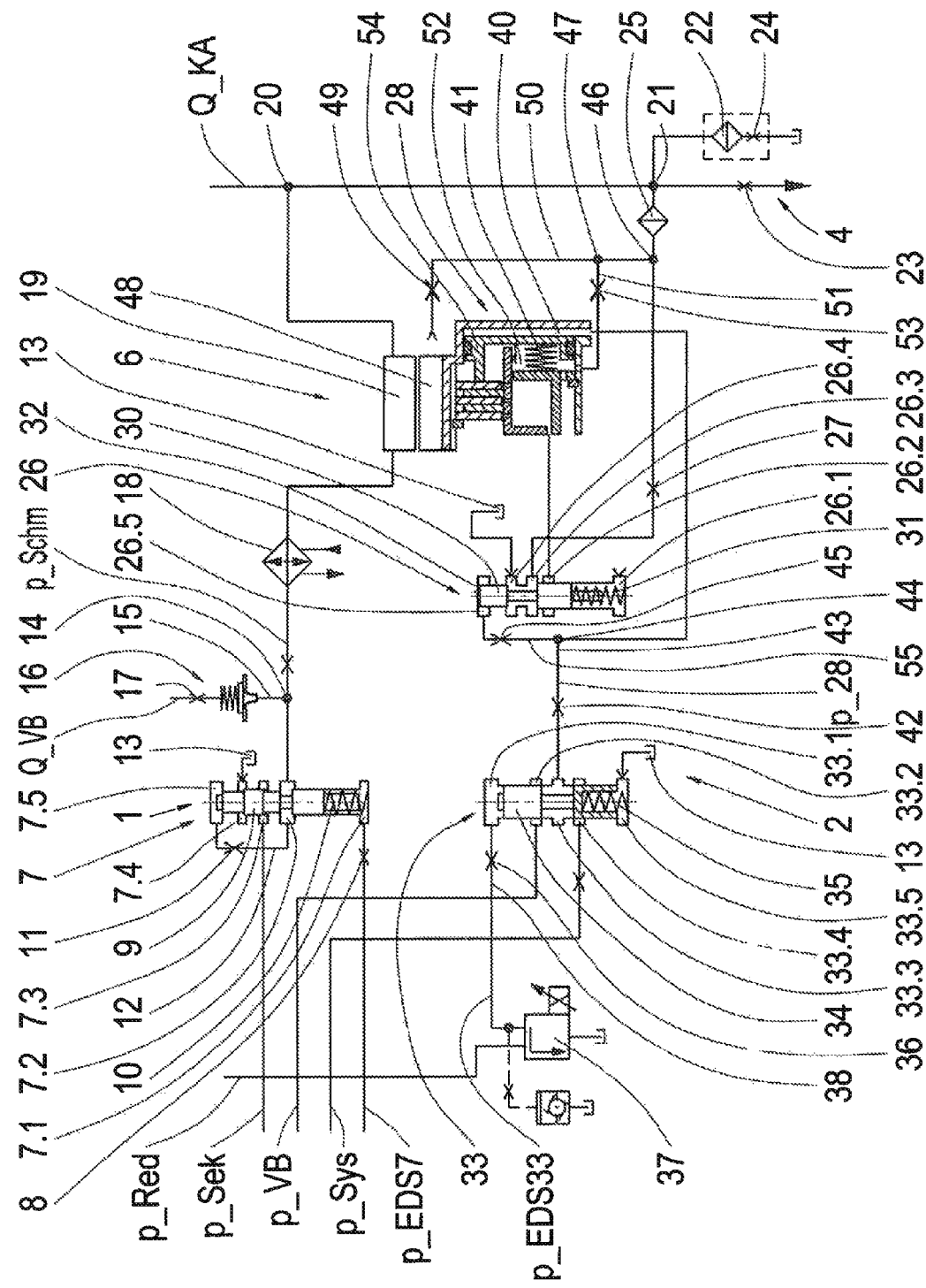

HYDRAULIC SYSTEM OF A TRANSMISSION DEVICE WITH A LUBRICATION CIRCUIT

FIELD OF THE INVENTION

The invention relates to a hydraulic system of a transmission device with a lubrication circuit that is supplied with lubrication fluid downstream of a cooling device.

BACKGROUND

Transmission devices known from practice typically comprise at least one hydraulic system, which is equipped with a lubrication circuit for cooling and lubrication. In addition, the hydraulic systems are designed with cooling devices, by means of which the temperature of the hydraulic fluid led into the hydraulic system can be controlled. In order to provide a requested cooling capacity, under certain circumstances, a volume flow of hydraulic fluid to be led through the cooling device is significantly greater than a volume flow of hydraulic fluid required for the cooling and lubrication of a transmission device. For this reason, the volume flow of hydraulic fluid led through the cooling device for the temperature control of the hydraulic fluid is used only partially in the lubrication circuit for the cooling and lubrication of the transmission device. The other portion of the volume flow of hydraulic fluid led through the cooling device is introduced downstream of the cooling device and upstream of the lubrication circuit in an oil sump of the transmission device, but this brings about undesirably high heat losses.

For hybrid vehicle drive trains with at least one internal combustion engine and at least one electric engine, through an engine decoupler, the internal combustion engine is connectable to, or separable from, the remaining drive train for the representation of different operating states of a hybrid vehicle drive train. With correspondingly designed vehicle concepts, such an engine decoupler is able to be supplied through a lubrication circuit of a hydraulic system of a transmission device for cooling and lubrication with hydraulic fluid. However, this is able to be realized only with a sufficiently high volume flow of hydraulic fluid to be led through the lubrication circuit with correspondingly high heat losses, which in turn impair the overall efficiency of a transmission device to an undesirable extent. In addition, lubrication circuits of existing hydraulic systems for the volume flows of hydraulic fluid necessary for this must be dimensioned in a correspondingly large size, but this is complex and precludes the use of existing transmission hydraulic concepts.

SUMMARY OF THE INVENTION

As such, this invention is subject to a task of providing a simply designed hydraulic system of a transmission device with a lubrication circuit, by means of which, with a good overall efficiency of a transmission device for cooling and lubrication, a shifting element of a hybrid vehicle drive train provided as an engine decoupler is able to be supplied with hydraulic fluid. Additional objects and advantages of the invention will be set forth in part in the following description, or may be obvious from the description, or may be learned through practice of the invention.

The hydraulic system of a transmission device in accordance with the invention comprises a lubrication circuit, which is able to be supplied with hydraulic fluid downstream of a cooling device. At least one part of the volume flow of hydraulic fluid led through the cooling device is able to be discharged downstream of the cooling device and upstream of the lubrication circuit in the direction of a hydraulic fluid reservoir.

A valve device is arranged downstream of the cooling device and upstream of the lubrication circuit. This valve device is transferable into a first operating state and into a second operating state, whereas, in the first operating state of the valve device, a volume flow of hydraulic fluid supplied to the valve device is able to be discharged at least partially in the direction of the hydraulic fluid reservoir and, in the second operating state of the valve device, a volume flow of hydraulic fluid supplied to the valve device is able to be supplied at least partially to a shifting element of the transmission device.

In the area of the lubrication circuit, based on the valve device, the hydraulic system is able to be executed as with conventionally designed hydraulic systems, since the volume flow of hydraulic fluid to be provided for the cooling and lubrication of the shifting element depending on the operating state is not led through the lubrication circuit in the direction of the shifting element, rather, when required, the volume flow of hydraulic fluid is extracted through the valve device, which is led downstream of the cooling device and upstream of the lubrication circuit in the direction the valve device in operative connection with the hydraulic fluid reservoir. Thus, compared to existing hydraulic systems for the cooling and lubrication of the shifting element, a volume flow of hydraulic fluid to be led into the hydraulic system in the direction of the lubrication circuit, which adversely affects the overall efficiency, does not have to increase. Furthermore, the hydraulic system in accordance with the invention may be implemented in existing transmission concepts with little effort.

With little effort, the overall efficiency of a transmission device designed with the hydraulic system in accordance with the invention is high, since, for the provision of the hydraulic fluid required for the shifting element, with the hydraulic system in accordance with the invention, the volume flow of hydraulic fluid is able to be extracted, which, with conventionally designed hydraulic systems, is supplied to the hydraulic fluid reservoir downstream of the cooling device and upstream of the lubrication circuit, without being used. As such, with the hydraulic system in accordance with the invention, a volume flow of hydraulic fluid circulated as a whole in the hydraulic system is not greater than with a known hydraulic system, through which no shifting element, such as an engine decoupler, is cooled and lubricated.

In a simple manner, the shifting element is able to be supplied, or not, with hydraulic fluid for cooling and lubrication through the valve device, in a manner corresponding to the respective operating state of the shifting element.

The possibility exists of, during operating states during which a transfer capacity of the shifting element is at least nearly equal to zero, correspondingly reducing a volume flow of hydraulic fluid in the area of the valve device supplied to the shifting device, or completely detaching the connection between the cooling device and the shifting element, in order to advantageously minimize drag torques in the area of the shifting element.

In contrast to this, in turn during operating states of the shifting element at which a load of the shifting element is at a maximum, the possibility exists of adjusting, in a corresponding large extent, a volume flow of hydraulic fluid supplied to the shifting element through the valve device, in order to be able to provide a required cooling and lubrication capacity in the area of the shifting element.

If the additional shifting element is, for example, an engine decoupler of a hybrid vehicle drive train, based on the overall efficiency of a transmission device designed with the hydraulic system in accordance with the invention, which is improved compared to conventional transmission concepts, a vehicle is able to be operated in a purely electrical operation over a greater range, with equal energy needs.

With a design of the hydraulic system in accordance with the invention that is able to be produced easily and cost-effectively, the valve device is designed as a shifting valve device, which is adjustable between a first shifting state and a second shifting state, whereas a volume flow of hydraulic fluid supplied to the shifting valve device is able to be discharged in the first shifting state of the shifting valve device in the direction of the hydraulic fluid reservoir, and is able to be supplied to the shifting element in the second shifting state of the shifting valve device.

A volume flow of hydraulic fluid advanced in the direction of the transmission device for cooling and lubricating the transmission device is adjustable, essentially independent of the operating state or shifting state of the valve device, if a throttle device, by means of which a volume flow of hydraulic fluid is supplied to the valve device, is provided upstream of the valve device. Through the throttle device, influences resulting from various flow resistances during an outflow of hydraulic fluid in the direction of the hydraulic fluid reservoir in the first operating state of the valve device, and during a supply of the shifting element with hydraulic fluid in the second operating state of the valve device, are avoidable in a simple manner.

With an embodiment of the hydraulic system in accordance with the invention that is simply operable, the valve device is able to be electrohydraulically actuated, whereas the operating pressure of the valve device is adjustable through a pressure regulator device.

As an alternative to this, with an embodiment of the hydraulic system in accordance with the invention that saves installation space and costs, the operating pressure of the valve device is adjustable in the area of an additional valve device supplying the shifting element with operating pressure and designed in particular as a regulating valve device. The valve device is transferable, for example, in the first operating state or in the second operating state, if the operating pressure specifiable by the additional valve device exceeds a defined threshold value. The regulating valve device may be pilot-controllable, whereas the pilot pressure of the additional valve device is preferably adjustable in the area of the pressure regulator device.

As an additional alternative to this, it may also be provided that the operating pressure of the valve device is directly adjustable through a pressure regulator device provided for the pilot control of the additional valve device. Moreover, with such a design, a separate pressure regulator device is not required for the valve device.

With an advantageous hydraulic system in accordance with the invention, it is provided that the hydraulic fluid is able to be led downstream of the cooling device and upstream of the lubrication circuit through a stator of an electric engine, in order to be able to operate the electric engine in an operating temperature range required for a high efficiency.

As an alternative or in addition, it can also be provided that the share of the volume flow of hydraulic fluid conducted through the cooling device led upstream of the lubrication circuit in the direction of the valve device is partially used for the cooling of a rotor. A volume flow of hydraulic fluid sprayed, for example, on coil windings of the rotor is adjustable or terminable, preferably through a throttle device, which is arranged in a line leading to the rotor.

Particularly parallel to the supply of the lubrication circuit with hydraulic fluid or upstream of the lubrication circuit, with an advantageous design of the hydraulic system in accordance with an embodiment of the invention, a chamber of the shifting element is able to be supplied with hydraulic fluid; in the area of this, a force counteracting an actuation of the shifting element in the closing direction is able to be applied on one piston of the shifting element. Thereby, in a simple manner, an undesired actuation of the shifting element can be avoided; otherwise, under certain circumstances, this is triggered by a dynamic pressure applied in the area of a piston chamber at the piston element. The dynamic pressure is caused by centrifugal forces acting on the hydraulic fluid present in the piston chamber, which have an effect in the area of the piston chamber that is able to be supplied with hydraulic fluid by the additional valve device, during a rotation of the shifting element. Preferably a throttle device is arranged in one line supplying the piston chamber with hydraulic fluid; through this, a volume flow of hydraulic fluid supplied to the piston chamber is adjustable.

With an additional advantageous embodiment of the hydraulic system in accordance with the invention, a throttle device is arranged downstream of a branch point of a line connecting the additional valve device with the valve device, in the area of which a volume flow of hydraulic fluid led downstream of the valve device is separated in part for the actuation of the shifting element and in the other part for the actuation of the valve device. Through the throttle device, an undesired erratic transition of the valve device between the first operating state and the second operating state is preventable in a simple manner, and a preferably gradual adjustment of a valve slide of the valve device can be shown. In addition, through the valve device, a dynamic decoupling of the valve device from the operating pressure specifiable by the additional valve device can be easily obtained, such that a sudden drop or overshoot of the operating pressure operating the shifting element can be prevented if the transfer capacity of the shifting element is reduced or adjusted to a value equal to zero.

The shifting element may be operated independently of temperature effects and tolerances in a line connecting the additional valve device to the shifting element, if a throttle device is arranged in the line connecting the additional valve device to the shifting element. The throttle device is arranged in particular downstream of the additional valve device and upstream of a branch point, in the area of which a volume flow of hydraulic fluid led through the additional valve device can be divided partially for the actuation of the shifting element and partially for the actuation of the valve device.

For achieving damping and vibration stability, a throttle device may be arranged upstream of the additional valve device and downstream of the pressure regulator device.

With an advantageous version of a hydraulic system in accordance with the invention, a lubricant pressure regulator device is provided for the adjustment of the lubricant pressure in the lubrication circuit, which device is arranged upstream of the cooling device and by means of which the volume flow of hydraulic fluid that is able to be led to the cooling device is adjustable depending on the operating state. The lubricant pressure regulator device may be designed as a pressure reducing valve (for example) and pilot-controlled through a pressure regulator device (for example), whereas, for the adjustment of the lubricant pressure, in particular, the pressure of a secondary circuit of the hydraulic system in accordance with the invention is reducible to a desired pressure value, depending on the operating condition.

To provide a pre-filling circuit with hydraulic fluid, the possibility exists of, in particular downstream of the lubricant pressure regulator device and upstream of the cooling device, branching a volume flow of hydraulic fluid preferably through a non-return valve device in the pre-filling circuit. Downstream of the non-return valve, a throttle device can be provided, in order to be able to adjust a volume flow of hydraulic fluid that is able to be led to the pre-filling circuit.

With an additional advantageous embodiment of the hydraulic system in accordance with the invention for the cooling and lubrication of the additional shifting element, for example a shifting clutch of the transmission device, a volume flow of hydraulic fluid is able to be branched upstream of the lubricating circuit. A supply of the additional shifting element with hydraulic fluid from the lubrication circuit is adjustable in particular through a valve device, for example, a shifting valve device, depending on the operating condition.

With an advantageous version of a hydraulic system in accordance with the invention, the additional valve device designed as a regulating valve device is supplied with a system pressure for the adjustment of the operating pressure and with a pre-filling pressure for the prevention of the accumulation of air.

Both the characteristics specified in the claims and the characteristics specified in the subsequent embodiments of the hydraulic system in accordance with the invention are, by themselves alone or in any combination with one another, suitable for providing additional forms for the object in accordance with the invention. In terms of the additional forms of the object in accordance with the invention, the particular combinations of characteristics do not represent a limitation; rather, they are essentially solely of an exemplary nature.

BRIEF DESCRIPTION OF THE DRAWING

Additional advantages and advantageous embodiments of the invention arise from the claims and the embodiment described with reference to the drawing in terms of principle.

The only FIGURE (FIG. 1) of the drawing shows a highly simplified hydraulic diagram of a part of a preferred embodiment of the hydraulic system in accordance with the invention, with a lubrication circuit.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

A highly schematized hydraulic diagram of a hydraulic system 1 of a transmission device 2 is shown in the FIGURE; this may be designed, for example, as an automatic transmission with eight transmission ratios for forward travel and at least one transmission ratio for reverse travel. The hydraulic system 1 features a lubrication circuit 4, which, as a shifting element 28 downstream of a cooling device 18, is able to be supplied with hydraulic fluid for the cooling and lubrication of the transmission device 2. In the present case, the shifting element 28 is designed as an engine decoupler of a hybrid vehicle drive train, by means of which an internal combustion engine not shown in more detail in the drawing may be switched on in the power flow of the drive train, or may be switched off from this. In addition to the internal combustion engine, the hybrid vehicle drive train is also designed with an electric engine 6.

The lubrication circuit 4 is able to be supplied with hydraulic fluid by a secondary pressure circuit of the hydraulic system 1, whereas, at one lubricant pressure regulator device designed as a pressure reducing valve, with shifting tongues 7.1 to 7.5, a secondary pressure p_Sek taking effect in the secondary pressure circuit is applied. Downstream of the pressure reducing valve 7, the lubricant pressure p_Schm is adjustable, depending on the pilot pressure p_EDS7 specifiable by the pressure regulator device, which is not more specifically shown. Through the pilot pressure p_EDS7, a compressive force component having equal effect with a spring device 10 is able to be applied at a valve slide 9 of the pressure reduction valve 7.

The secondary pressure p_Sek is applied at the pressure reducing valve 7 in the area of the shifting tongue 7.3, and the pilot pressure p_EDS7 is applied in the area of the shifting tongue 7.1. A throttle device 8 is provided upstream of the shifting tongue 7.1 of the pressure reduction valve 7; by means of this, a vibration stability of the hydraulic system 1 is able to be achieved in the area of the shifting tongue 7.1. The shifting tongue 7.2 is connected to the shifting tongue 7.5 through a line 12, which is in turn designed with a throttle device 11 in order to improve vibration stability. Thus, the hydraulic pressure taking effect in the area of the shifting tongue 7.2 is also applied in the area of the shifting tongue 7.5. In the area of the shifting tongue 7.4 of the pressure reducing valve 7, hydraulic fluid is derivable in the direction of a hydraulic fluid reservoir 13 that is essentially pressureless.

In the position shown in the FIGURE, the valve slide 9 is pushed by the secondary pressure p_Sek against the spring force of the spring device 10 and the applied pilot pressure p_EDS7, completely into a first end position, in which the cooling device 18 and the lubrication circuit 4 are supplied with lubricant pressure p_Schm, which may be reduced if necessary in respect of the secondary pressure p_Sek.

Downstream of the pressure reducing valve 7 and upstream of the cooling device 18, a line 15 branches from a branch point 14 in the direction of a pre-filling circuit. A non-return valve device 16 and a throttle device 17, which is arranged in relation to the branch point 14 downstream of the non-return valve device 16, are provided in the line 15. Above a response threshold of the non-return valve device 16, the pre-filling circuit is supplied with a volume flow of hydraulic fluid Q_VB.

In turn, downstream of the cooling device 18, the overall volume flow of hydraulic fluid led through the cooling device 18 is able to be led through a stator 19 of the electric engine 6, in order to be able to control the temperature of this in the desired extent. In the area of a branch point 20, which lies downstream of the stator 19, a volume flow of hydraulic fluid Q_KA branches off; through this, the shifting element of the transmission device 2, which is designed in particular as a shifting clutch, is able to be cooled. With an alternative version of the hydraulic system, the volume flow of hydraulic fluid Q_KA is adjustable, for example, through a shifting valve device, depending on the operating state.

In the area of an additional branch point 21 also upstream of the lubrication circuit 4 and downstream of the branch point 20, the existing volume flow of hydraulic fluid is further led in part through a throttle device 23 in the direction of the lubrication circuit 4, and in the other part in the direction of an additional element 22 to be lubricated, for example, a chain of a pump drive, whereas this part flows off downstream of the element 22 through a throttle device 24 in the direction of the hydraulic fluid reservoir 13. The remaining part of the volume flow of hydraulic fluid is led into the area of the branch point 21 through a filter device 24, among other things in the direction of a valve device 26 designed in the present case as a shifting valve device, with shifting tongues 26.1 to 26.5. In turn, a throttle device 27 is provided between the branch point 21 and the shifting tongue 26.3 of the shifting valve device 26.

Through the operating pressure p_28 that is able to be applied through a valve slide 30 in the area of an effective surface 30, against the spring force of a spring device 31 engaging on the valve device 30, the shifting valve device 26 is switchable from the first shifting position shown in the FIGURE into a second shifting position, whereas, here, the operating pressure p_28 is applied in the area of the shifting tongue 26.5 of the shifting valve device 26. The volume flow of hydraulic fluid supplied to the shifting valve device 26 in the area of the shifting tongue 26.3 is, depending on the shifting position of the shifting valve device 26, able to be led through the shifting tongue 26.4 in direction of the hydraulic fluid reservoir 13 or through the shifting tongue 26.2 in the direction of the shifting element 28.

In the first shifting position of the shifting valve device 26, a volume flow of hydraulic fluid applied in the area of the shifting tongue 26.3 is led through the shifting tongue 26.4 in direction of the hydraulic fluid reservoir 13. In contrast to this, the volume flow of hydraulic fluid applied in the area of the shifting tongue 26.3 is led into the second shifting position of the valve slide 30 through the shifting tongue 26.2 in the direction of the engine decoupler 28, whereas the volume flow of hydraulic fluid supplied to the engine decoupler 28 is determined depending on the lubricant pressure p_Schm of the lubrication circuit 4 and is adjustable through the pressure reducing valve 7.

Through the throttle device, for example designed as a supply gate 27, a volume flow of hydraulic fluid supplied to the shifting valve device 26 can be held at an essentially constant level, independent of the shifting state of the shifting valve device 26, such that the volume flow of hydraulic fluid supplied to the lubrication circuit 4 is essentially independent of the respective existing shifting status of the shifting valve device 26. In particular, at an operating state of the engine decoupler 28 at which the transfer capacity of the engine decoupler 28 is essentially zero, and the internal combustion engine is disconnected from the hybrid vehicle drive train, the shifting valve device 26 is present in the first shifting state, in order to reduce drag torques in the area of the engine decoupler 28 compared to a long-lasting supply of the engine decoupler 28 with a volume flow of hydraulic fluid.

During an operating state of the engine decoupler 28 at which the turning moment is transferred through the engine decoupler, the shifting valve device 26 is preferably transferred into its second shifting state, in order to be able to supply and cool the engine decoupler 28 with a volume flow of hydraulic fluid. Thus, rotational irregularities arising in the area of the internal combustion engine and impairing driving comfort are not introduced, or introduced only in a small extent, into the hybrid vehicle drive train; the possibility exists of operating the engine decoupler 28 in a slipping manner.

The operating pressure p_28 or the shifting pressure of the shifting valve device 26, which is also equivalent to the operating pressure p_28 of the shifting element 28, is specified in the area of an additional valve device 33 designed as a regulating valve device, with shifting tongues 33.1 to 33.5. A pre-filling pressure p_VB is applied at the shifting tongue 33.2 of the additional valve device 33. In addition, a system pressure p_Sys is applied in the area of the additional shifting tongue 33.4 of the regulating valve device 33. Depending on the pilot pressure p_EDS33 applied at the shifting tongue 33.1, in the area of which a valve slide 34 of the additional valve device 33 is able to be supplied with a pressure force component, which counteracts a spring force of a spring device 35 engaging on the valve device 34, the operating pressure p_28 of the engine decoupler 28 and the valve device 26, which depends on the system pressure p_Sys, is adjustable.

The operating pressure p_28 of the engine decoupler 28 is able to be applied at a piston 54 of the engine decoupler 28 through a line 43 leading from the shifting tongue 33.3 of the additional valve device 33 in the direction of the engine decoupler 28 in the area of a piston chamber 40, in order to be able to actuate the engine decoupler 28 in a desired extent. Thereby, a spring device 41 counteracting the operating pressure p_28 engages on the piston 54, which spring device transfers the shifting element 28 below a pressure value of the operating pressure p_28 into an open operating state.

The pilot pressure p_EDS33 is infinitely variable through electrical control signals in the area of a pressure regulator device 37 within a pressure range, whereas the pressure range extends from zero up to a maximum pressure value, which in this case corresponds to a reducing pressure p_Red applied at the pressure regulator device 37. By means of a throttle device 36 arranged in a line 38 downstream of the pressure regulator device 37 and upstream of the regulating valve device 33, damping and vibration stability in the area of the line 38 can be improved; this line leads from the pressure regulator device 37 to the shifting tongue 33.1 of the regulating valve device 33.

If the pilot pressure p_EDS33 of the regulating valve device 33 exceeds a defined threshold value, at which the valve slide 34 is pushed against the spring force of the spring device 35 into a position in which the valve slide 34 at least partially releases a connection between the shifting tongue 33.4 and the shifting tongue 33.3, the valve slide 30 of the valve device 26 in the area of the effective surface 32 is supplied with the current pressure p_28 present in the area of the shifting tongue 33.3 of the additional valve device 33.

If the pressure p_28 in the area of the shifting tongue 33.3 of the additional valve device 33 and thus in the area of the effective surface 32 of the valve slide 30 of the valve device 26 reaches a value at which the valve device 26 passes into the second pushed shifting position, the volume of hydraulic fluid led from the branch point 46 in the direction of the valve device 26 is further led in the direction of the shifting element 28. At this pressure value of the operating pressure p_28, the shifting element 28 also features an operating state or a transfer capacity, at which, in the area of the shifting element 28, friction forces releasing a heat load occur. Through the volume flow of hydraulic fluid applied by the valve device 26 on the shifting element 28, the heat that arises during operation is able to be dissipated in the desired extent.

Downstream of the shifting tongue 33.3, the regulating valve device 33 of a throttle device 42 is arranged; by means of this, a volume flow of hydraulic fluid led to the engine decoupler 28 can be adjusted, independent of heat influences and tolerances in the line connecting the regulating valve device 33 to the engine decoupler 28. Here, the throttle device 42 is arranged downstream of the regulating valve device 33 and upstream of a branch point 44; in the area of this, a volume flow of hydraulic fluid led through the regulating valve device 33 is led in part in the direction of the engine decoupler 28 and in the other part in the direction of the shifting valve device 26.

An additional throttle device 45 in a line 55 is, in turn, arranged downstream of the branch point 44 and upstream of the shifting tongue 26.5 of the shifting valve device 26. Through the throttle device 45, an erratic switching of the shifting valve device 26 between the first shifting state and the second shifting state can be prevented, and a slow moving of the valve slide 30 of the shifting valve device 26 upon an increase in the operating pressure $p\_28$ of the shifting valve device 26 can be ensured. In addition, in a simple manner, a dynamic decoupling of the shifting valve device 26 from the operating pressure $p\_28$ present in the line 43 can be achieved through the throttle device 45.

Through the hydraulic system 1, downstream of the filter device 25 and of the branch point 46, and downstream of an additional branch point 47, a rotor 48 of the electric engine 6 is also able to be supplied with hydraulic fluid. Thereby, downstream of the additional branch point 47, a throttle device 49 is arranged in a line 50 leading to the rotor 48; by means of this, a volume flow of hydraulic fluid, which is sprayable in particular directly on the coil windings of the rotor 48, is adjustable, depending on the operating condition.

Through a line 51 running parallel to the line 50 and branching from the additional branch point 47, a chamber 52, featuring the spring device 41, of the engine decoupler 28 upstream of the lubrication circuit 4 is able to be supplied with hydraulic fluid, whereas a volume flow of hydraulic fluid led to the chamber 52 is adjustable through a throttle device 53 arranged in the line 51, depending on the operating condition.

If the engine decoupler 28 is rotating, as a result of centrifugal forces, a dynamic pressure arises in the area of the piston chamber 40 filled with hydraulic fluid, which applies on the piston 54 of the engine decoupler 28 against the spring force of the spring device 41, and under certain circumstances affects the transfer capacity of the engine decoupler 28. In order to counteract this effect on the piston 54, the chamber 52, which forms a dynamic pressure equalization chamber, is supplied with hydraulic fluid through the line 51. With the chamber 52 filled with the hydraulic fluid, the centrifugal forces in the operation of the engine decoupler 28 in the chamber 52 likewise produce a dynamic pressure, which is applied with an effect equal to the spring force of the spring device 41 on the piston 54. This dynamic pressure counteracts the dynamic pressure arising from the centrifugal forces and present in the piston chamber 40, such that the dynamic pressure caused by the centrifugal forces and applied in an opposite direction on the piston 54 are, in the ideal case, essentially neutralized.

In addition, through the hydraulic fluid supplied to the chamber 52, the bearing of the engine decoupler 28 is also cooled and lubricated. If the chamber 52, starting from a state completely filled with hydraulic fluid, is further supplied with hydraulic fluid, hydraulic fluid is led from the chamber 52 in the direction of friction linings of the engine decoupler 28 preferably designed as a multi-disk clutch, whereas such a volume flow of hydraulic fluid is very small. In an operating state of the engine decoupler 28 at which the transfer capacity of the engine decoupler 28 is essentially equal to zero, only very small drag torques are generated by hydraulic fluid led between the friction linings in this manner. The significant cooling of the friction linings of the engine decoupler 28 takes place through the shifting valve device 26, through which a significantly larger volume flow of hydraulic fluid is sprayed between multi-disks of the engine decoupler 28, in particular centrally.

As an alternative to the version that is shown, with which the shifting valve device 26 is actuated by operating pressure $p\_28$ emanating from the regulating valve device 33, with alternative versions of the invention, it may also be provided that the shifting valve device 26 is actuated directly through the pressure regulator device 37 or through an additional pressure regulator device.

All throttle devices 8, 11, 17, 23, 24, 27, 36, 42, 45, 49, 53 of the hydraulic system 1 may be designed as gates.

Modifications and variations can be made to the embodiments illustrated or described herein without departing from the scope and spirit of the invention as set forth in the appended claims.

The invention claimed is:

1. A hydraulic system in a transmission device, comprising:
    a lubrication circuit that is supplied with hydraulic fluid downstream of a cooling device, wherein at least part of the volume of flow of hydraulic fluid through the cooling device is discharged upstream of the lubrication circuit;
    a valve device arranged downstream of the cooling device and upstream of the lubrication circuit to receive the volume flow of hydraulic fluid discharged upstream of the lubrication circuit, the valve device transferable between a first operating state and a second operating state;
    in the first operating state of the valve device, a volume flow of hydraulic fluid supplied to the valve device from the cooling device is discharged to a hydraulic fluid reservoir; and
    in the second operating state of the valve device, a volume flow of hydraulic fluid supplied to the valve device from the cooling device is supplied at least partially to a shifting element in the transmission device.

2. The hydraulic system as in claim 1, wherein the valve device is a shifting valve device having a first shifting state wherein the volume flow of hydraulic fluid to the shifting device is discharged to the hydraulic fluid reservoir, and a second shifting state wherein the volume flow of hydraulic fluid supplied to the valve device is supplied at least partially to a shifting element in the transmission device.

3. The hydraulic system as in claim 2, further comprising valve device upstream of the shifting valve device that adjusts the volume flow of hydraulic fluid to the shifting valve device.

4. The hydraulic system as in claim 3, wherein operating pressure of the shifting valve device is adjustable by way of a regulating valve device that supplies the shifting valve device with the operating pressure.

5. The hydraulic system as in claim 1, further comprising a stator of an electric engine arranged downstream of the cooling device and upstream of the lubrication circuit that is cooled by hydraulic fluid from the cooling device.

6. The hydraulic system as in claim 5, further comprising a rotor of an electric engine arranged downstream of the cooling device and upstream of the lubrication circuit that is cooled by hydraulic fluid from the cooling device.

7. The hydraulic system as in claim 1, wherein the shifting element comprises a piston, and a chamber that is supplied with the hydraulic fluid that counteracts an actuation force on the piston.

8. The hydraulic system as in claim 1, further comprising a lubricant pressure regulator device arranged upstream of the cooling device to adjust flow of the hydraulic fluid through the cooling device.

9. The hydraulic system as in claim 1, further comprising a line upstream of the cooling device through which a volume flow of hydraulic fluid is directed to a filling circuit.

10. The hydraulic system as in claim 1, further comprising a line downstream of the cooling device circuit and upstream of the lubrication circuit through which a volume flow of hydraulic fluid is directed to an additional shifting element.

11. A hydraulic system in a transmission device, comprising:
a lubrication circuit that is supplied with hydraulic fluid downstream of a cooling device, wherein at least part of the volume of flow of hydraulic fluid through the cooling device is discharged upstream of the lubrication circuit to a hydraulic fluid reservoir;
a valve device arranged downstream of the cooling device and upstream of the lubrication circuit, the valve device transferable between a first operating state and a second operating state;
in the first operating state of the valve device, a volume flow of hydraulic fluid supplied to the valve device is discharged to a hydraulic fluid reservoir;
in the second operating state of the valve device, a volume flow of hydraulic fluid supplied to the valve device is supplied at least partially to a shifting element in the transmission device;
wherein the valve device is a shifting valve device having a first shifting state wherein the volume flow of hydraulic fluid to the shifting device is discharged to the hydraulic fluid reservoir, and a second shifting state wherein the volume flow of hydraulic fluid supplied to the valve device is supplied at least partially to a shifting element in the transmission device;
further comprising valve device upstream of the shifting valve device that adjusts the volume flow of hydraulic fluid to the shifting valve device;
wherein operating pressure of the shifting valve device is adjustable by way of a regulating valve device that supplies the shifting valve device with the operating pressure; and
wherein the regulating valve device is pilot controlled and operating pressure of the shifting valve device is adjustable by adjusting a pilot pressure at the regulating valve device.

12. A hydraulic system in a transmission device, comprising:
a lubrication circuit that is supplied with hydraulic fluid downstream of a cooling device, wherein at least part of the volume of flow of hydraulic fluid through the cooling device is discharged upstream of the lubrication circuit to a hydraulic fluid reservoir;
a valve device arranged downstream of the cooling device and upstream of the lubrication circuit, the valve device transferable between a first operating state and a second operating state;
in the first operating state of the valve device, a volume flow of hydraulic fluid supplied to the valve device is discharged to a hydraulic fluid reservoir;
in the second operating state of the valve device, a volume flow of hydraulic fluid supplied to the valve device is supplied at least partially to a shifting element in the transmission device;
wherein the valve device is a shifting valve device having a first shifting state wherein the volume flow of hydraulic fluid to the shifting device is discharged to the hydraulic fluid reservoir, and a second shifting state wherein the volume flow of hydraulic fluid supplied to the valve device is supplied at least partially to a shifting element in the transmission device;
further comprising valve device upstream of the shifting valve device that adjusts the volume flow of hydraulic fluid to the shifting valve device;
wherein operating pressure of the shifting valve device is adjustable by way of a regulating valve device that supplies the shifting valve device with the operating pressure; and
further comprising a throttle device arranged in a line connecting the regulating valve device to the shifting valve device downstream of a branch point, wherein at the branch point volume flow of hydraulic fluid through the regulating valve device is directed in part to the shifting element and in part to the shifting valve device.

13. The hydraulic system as in claim 12, further comprising a throttle device arranged in the line between the regulating valve device and the shifting element upstream of the branch point.

14. A hydraulic system in a transmission device, comprising:
a lubrication circuit that is supplied with hydraulic fluid downstream of a cooling device, wherein at least part of the volume of flow of hydraulic fluid through the cooling device is discharged upstream of the lubrication circuit to a hydraulic fluid reservoir;
a valve device arranged downstream of the cooling device and upstream of the lubrication circuit, the valve device transferable between a first operating state and a second operating state;
in the first operating state of the valve device, a volume flow of hydraulic fluid supplied to the valve device is discharged to a hydraulic fluid reservoir;
in the second operating state of the valve device, a volume flow of hydraulic fluid supplied to the valve device is supplied at least partially to a shifting element in the transmission device;
wherein the valve device is a shifting valve device having a first shifting state wherein the volume flow of hydraulic fluid to the shifting device is discharged to the hydraulic fluid reservoir, and a second shifting state wherein the volume flow of hydraulic fluid supplied to the valve device is supplied at least partially to a shifting element in the transmission device;
further comprising valve device upstream of the shifting valve device that adjusts the volume flow of hydraulic fluid to the shifting valve device;
wherein operating pressure of the shifting valve device is adjustable by way of a regulating valve device that supplies the shifting valve device with the operating pressure; and
further comprising a throttle device arranged in a line between the regulating valve device and a pressure regulator device.

* * * * *